United States Patent [19]
Bruun et al.

[11] Patent Number: 5,161,364
[45] Date of Patent: Nov. 10, 1992

[54] CONTROL OF AIRCRAFT BLEED AIR STAGE MIXING

[75] Inventors: Eugene R. Bruun, Simsbury, Conn.; Joseph M. Kos, Holyoke, Mass.

[73] Assignee: United Technologies Corporation, Hartford, Conn.

[21] Appl. No.: 678,502

[22] Filed: Apr. 1, 1991

[51] Int. Cl.⁵ ............................................. F02C 7/00
[52] U.S. Cl. ............................... 60/39.02; 60/39.07
[58] Field of Search ............ 60/39.02, 39.07, 39.093, 60/39.29; 137/606; 454/71, 72, 73, 74

[56]         References Cited
        U.S. PATENT DOCUMENTS

| | | | |
|---|---|---|---|
| 3,446,425 | 5/1969 | Cleeves | 60/39.07 |
| 3,487,993 | 1/1970 | Rannenberg | 60/39.07 |
| 3,981,466 | 9/1976 | Shah | 244/134 R |
| 4,285,466 | 8/1981 | Linscheid et al. | 236/13 |
| 4,482,114 | 11/1984 | Gupta et al. | 244/134 B |
| 4,550,561 | 11/1985 | Coffinberry | 60/39.07 |
| 4,775,117 | 10/1988 | Standke | 244/134 F |
| 5,063,963 | 11/1991 | Smith | 60/39.07 |

*Primary Examiner*—Louis J. Casaregola
*Attorney, Agent, or Firm*—Patrick J. O'Shea

[57]         ABSTRACT

A gas turbine engine bleed air system in which air flow from a high pressure and a low pressure compressor stage of a gas turbine engine are mixed together by controlling the pressure at the outlet of a proportional valve. The pressure is controlled by modulating the flow area of the proportional valve through which the high pressure air flows in order to achieve a scheduled pressure value. The scheduled pressure value is determined as a function of a temperature error at a location downstream of the proportional valve in the bleed air system.

8 Claims, 3 Drawing Sheets

CONTROL OF AIRCRAFT BLEED AIR STAGE MIXING

DESCRIPTION

1. Technical Field

This invention relates to the control of bleed air flow from an aircraft's gas turbine engine, and more particularly to controlling the set point of the bleed air temperature.

2. Background Art

As known, both commercial and military aircraft use bleed air from the aircraft's gas turbine engine to supply pneumatic and thermal energy to on-board systems which provide aircraft air conditioning, cabin pressurization, thermal anti-ice (TAI), and engine thrust reversal. The bleed air sources are the engine's high pressure (HP) and low pressure (LP) compressor stages; the HP stage providing bleed air at a pressure and temperature typically twice that of the LP stage.

Prior art bleed air control systems, such as that illustrated in Gupta et al. U.S. Pat. No. 4,482,114, select bleed air alternately from the HP stage and the LP stage, but not from both simultaneously. This type of system uses bistable valves to control flow in the bleed conduits from the HP and LP stages. An open/close (i.e., bistable) valve in the HP bleed conduit is gated on or off to provide full or zero HP bleed flow to a bleed air manifold, and a check valve in the LP conduit provides LP flow to the manifold in the absence of HP flow.

Improved efficiency prior art bleed systems provide a two tier HP flow arrangement in which two HP open/close valves are used. A low flow bistable valve is placed in parallel with a high flow valve. The HP high flow valve opens only when the low flow valve cannot supply the user system requirements. These systems, however, neither modulate the bleed air flow nor mix the HP and LP flows to achieve set point control of flow pressure or temperature. If the temperature of the LP bleed air is too low for system requirements (e.g., inlet air for the TAI system), the bleed system control opens the HP bleed valve. This results in a step increase in flow pressure and temperature which exceeds the bleed air requirements of the user system. The excess energy is wasted, while engine thrust is reduced by loss of the bleed air.

A prior art system which does provide mixing of the HP and LP air flows is disclosed in Linscheid et al. U.S. Pat. No. 4,285,466. This system uses a plurality of nozzle ejectors, each of which passes a different mass of HP compressed air into an air-mixing chamber where the HP air is mixed with LP air. Each nozzle is bistable and provides step control of HP air flow through it. As a result only a discrete number of mixed air temperatures are available since there are only a discrete number of nozzle states.

DISCLOSURE OF THE INVENTION

An object of the present invention is to provide a gas turbine engine bleed air system which mixes high pressure and low pressure bleed air from a gas turbine engine in a manner to control the temperature of the mixed bleed air flow to a selected value.

According to the present invention the high pressure (HP) flow passes through a proportional valve to mix with the low pressure (LP) flow, the proportional valve modulating the HP flow area to achieve a selected mixed air pressure which corresponds to a desired mixed air temperature.

The present invention may be used for providing mixed bleed air to a thermal anti-ice (TAI) system. Closed loop temperature and pressure control are used to modulate the flow area of the proportional valve to control pressure at the valve outlet, in order to regulate temperature at the user equipment inlet. This control can be performed without additional bleed air sensors, since the stations from which feedback information is obtained already contain sensors for other bleed system control functions.

Using a proportional valve to control the flow of the HP air allows the bleed air system to meet the demands of the systems it supplies, while extracting less energy from the engine.

These and other objects, features and advantages of the present invention will become more apparent in light of the following detailed description of a best mode embodiment thereof as illustrated in the accompanying drawings.

BEST MODE FOR CARRYING OUT THE INVENTION

Figure 1:
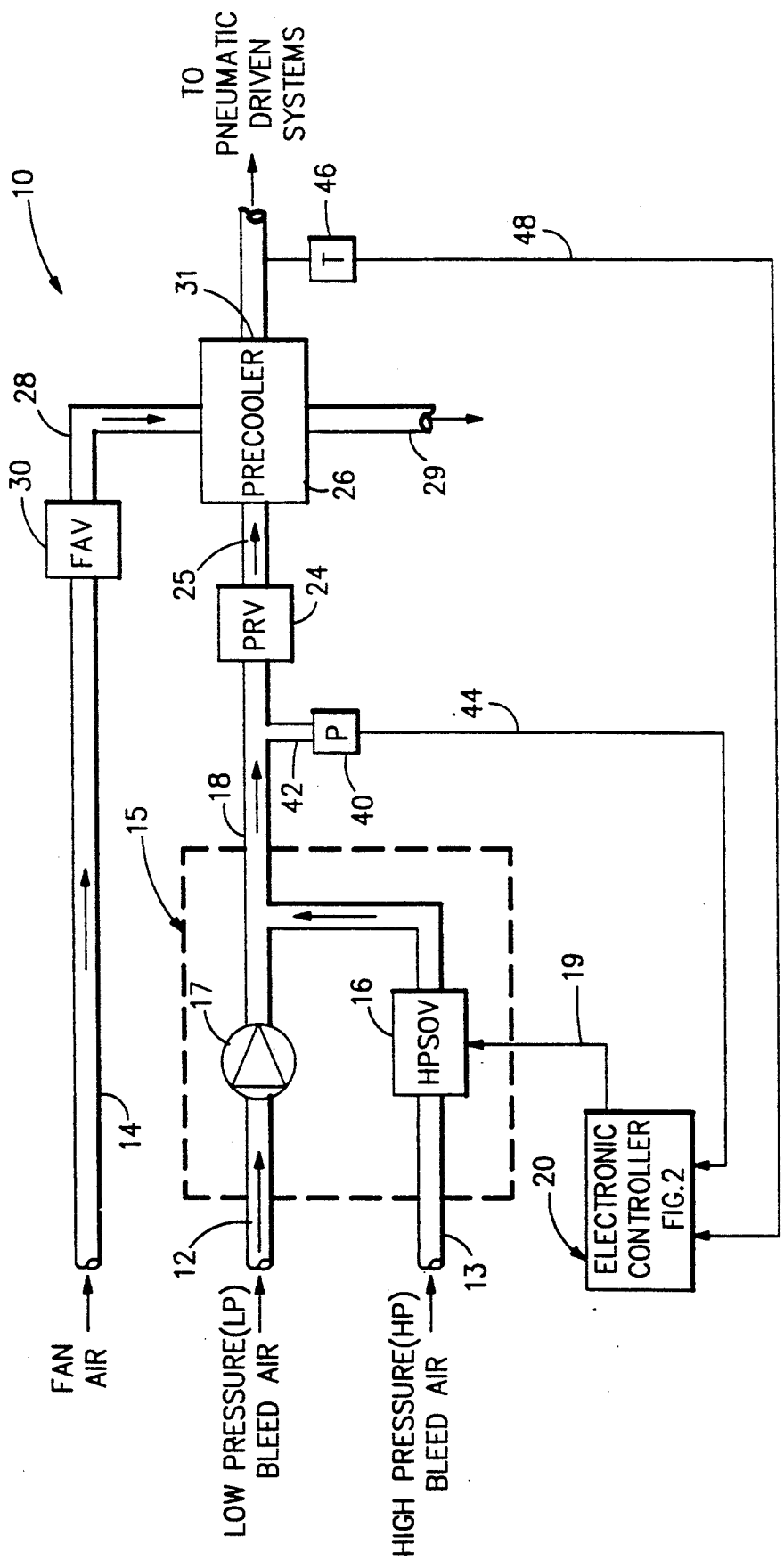
FIG. 1 is a schematic diagram of the bleed air system of the present invention.

In FIG. 1, the bleed air system 10 of the present invention receives the engine's low pressure (LP) and high pressure (HP) bleed air through conduits 12,13 respectively, and the engine fan air through conduit 14. Conduits 12,13 route bleed air to a source selector 15, which comprises a high pressure shut-off valve (HPSOV) 16 and a check valve 17. The HPSOV 16 regulates the flow of HP air entering a mixing conduit 18 in response to an electrical signal on a line 19 from an electronic controller 20. The HPSOV 16 is a proportional valve which allows the electronic controller 20 to modulate the area of the HPSOV through which HP air flows. The check valve 17 prevents HP air from back flowing to the engine LP compressor stage. Operation of the source selector 15, and more particularly the control of the source selector by the electronic controller 20, is described in detail hereinafter.

The mixing conduit 18 is connected to a pressure regulating valve (PRV) 24 which regulates the pressure in a conduit 25 to provide a pressure regulated flow of warm air to a precooler 26. The precooler 26 receives cool fan air on conduit 28 from a fan air valve (FAV) 30 which regulates the quantity of engine fan air passing from conduit 14 through the precooler 26. The precooler uses the fan air to remove heat from the pressure regulated flow of warm air from the PRV 24.

The HPSOV 16 operates in two modes: a bistable valve emulator mode, and a proportional valve mode. In the bistable mode the HPSOV operates in either the full open or full closed state similar to a bistable valve. However, under certain engine operating conditions, the HPSOV is operated in the proportional mode to modulate the HP airflow and reduce the amount of bleed air energy extracted from the engine.

A pressure sensor 40 measures static air pressure in the mixing conduit 18 via a non-flowing conduit 42, and provides an electrical feedback signal indicative thereof on a line 44 to the electronic controller 20. A temperature sensor 46 (e.g., a thermistor) measures the temperature of the mixed air exiting the precooler, and provides an electrical feedback signal indicative thereof on a line 48 to the electronic controller 20. The sensors 40,46 provide feedback information to individual inner and outer closed loop control functions within the controller 20.

Figure 2:
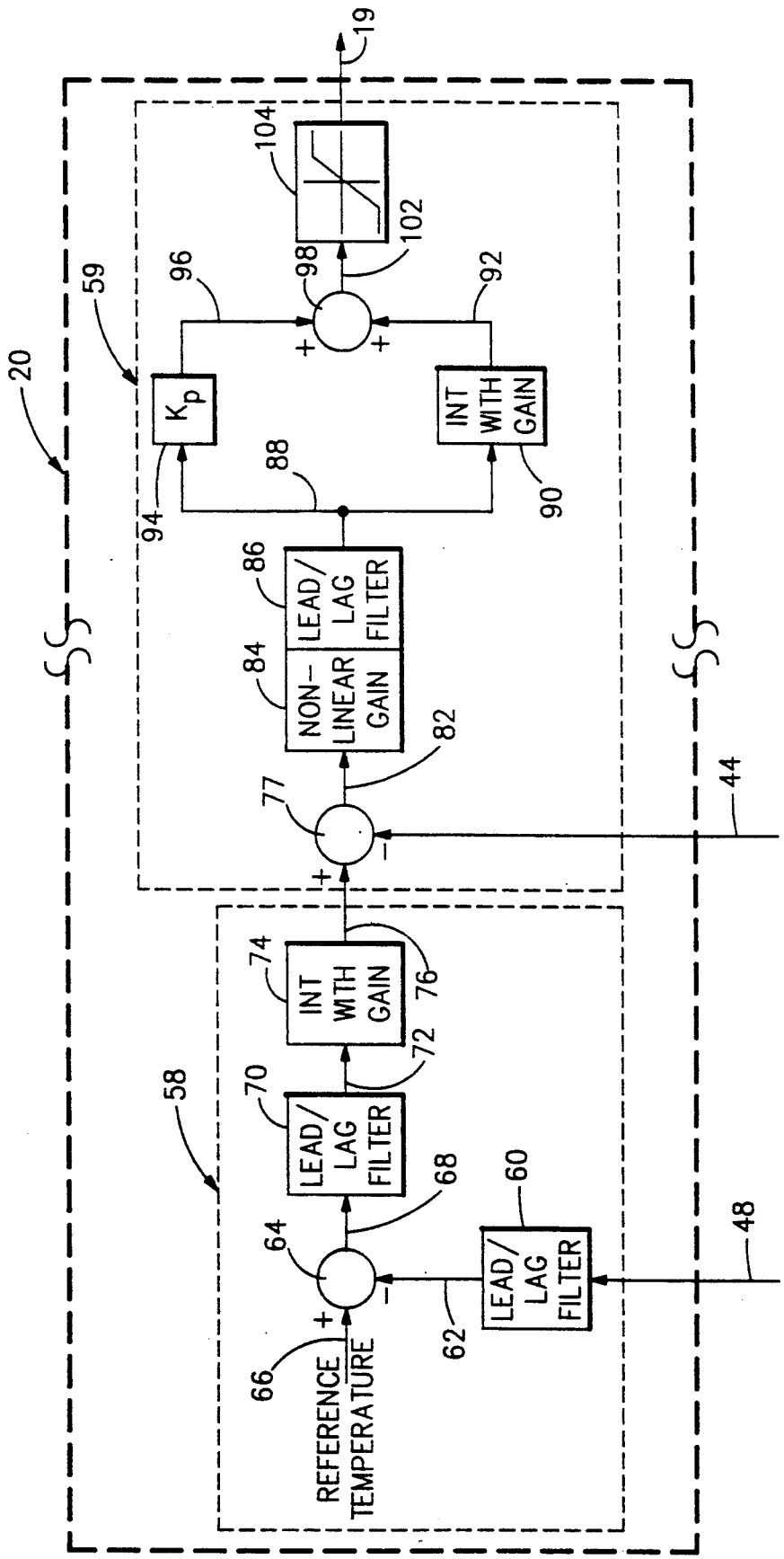
FIG. 2 is an illustration of the control logic used in the embodiment of FIG. 1.

FIG. 2 illustrates the control logic of the electronic controller for controlling the HPSOV in the proportional mode. The control logic comprises compensation for two loops: the outer closed loop on temperature 58 and the inner closed loop on pressure 59. The inner (pressure) loop is faster than the outer (temperature) loop (i.e., the inner loop has a higher bandwidth than the outer loop).

The controller receives the sensed pressure and the sensed temperature feedback signals on lines 44,48 respectively. The temperature signal is input to a lead/lag filter 60 which provides a filtered temperature signal on a line 62 to a summing junction 64. The summing junction provides the difference between a reference temperature signal on a line 66 and the filtered temperature signal on the line 62 as a temperature error signal on a line 68. The temperature error signal 68 is presented to a lead/lag filter 70 which provides a filtered temperature error signal on a line 72 to an integrator 74. The integrator 74 provides the time integrated value of the filtered temperature error signal as a pressure reference signal on a line 76 to the inner loop 59 (i.e., the signal on the line 76 is in the same units as the sensed pressure on the line 44).

Summing junction 77 takes the difference between the pressure reference signal on line 76 and the sensed pressure signal on the line 44 to provide a pressure error signal on a line 82. The pressure error signal is multiplied by a non-linear gain 84 and the resultant product is presented to a lead/lag filter 86. The filtered signal from the lead/lag filter 86 is presented on a line 88 to an integrator 90 with a gain which provides an output signal on a line 92, and to a proportional amplifier 94 having gain $K_p$ which provides a proportional signal on a line 96 into a summing junction 98. The summing junction 98 provides a proportional plus integral signal on a line 102 to a limiter 104 which limits the magnitude of a current signal on the line 19 to the HPSOV.

The inner pressure control 59 maintains the air pressure in the mixing conduit 18 substantially equal to the reference pressure signal on the line 76 (set as a function of integrated temperature error) by modulating the flow area of the HPSOV 16. Testing has illustrated that closed loop temperature control alone is not sufficient to control the temperature of the mixed air while operating the HPSOV in the proportional valve mode. However, adequate HPSOV proportional valve mode control is achieved using an outer closed loop on temperature with an inner closed loop on pressure.

To control the HPSOV as a proportional valve, the summing junction 64 calculates the error between the filtered temperature signal on the line 62 and the reference temperature signal on the line 66, and provides the error signal on the line 68 into the lead/lag 70. The integrator 74 provides the reference pressure on the line 76 for the inner loop which sets the command signal to the HPSOV on the line 19.

In the proportional valve mode, the HPSOV 16 is opened a small amount to provide some HP air for mixing with the LP air in the mixing conduit 18 (FIG. 1). The amount that the HPSOV is open is controlled by the control logic of FIG. 2. This small flow requirement is established by the fact that the check valve 17 will remain open only when the HPSOV outlet pressure is not substantially greater than the LP air pressure in the conduit 12.

Figure 3:
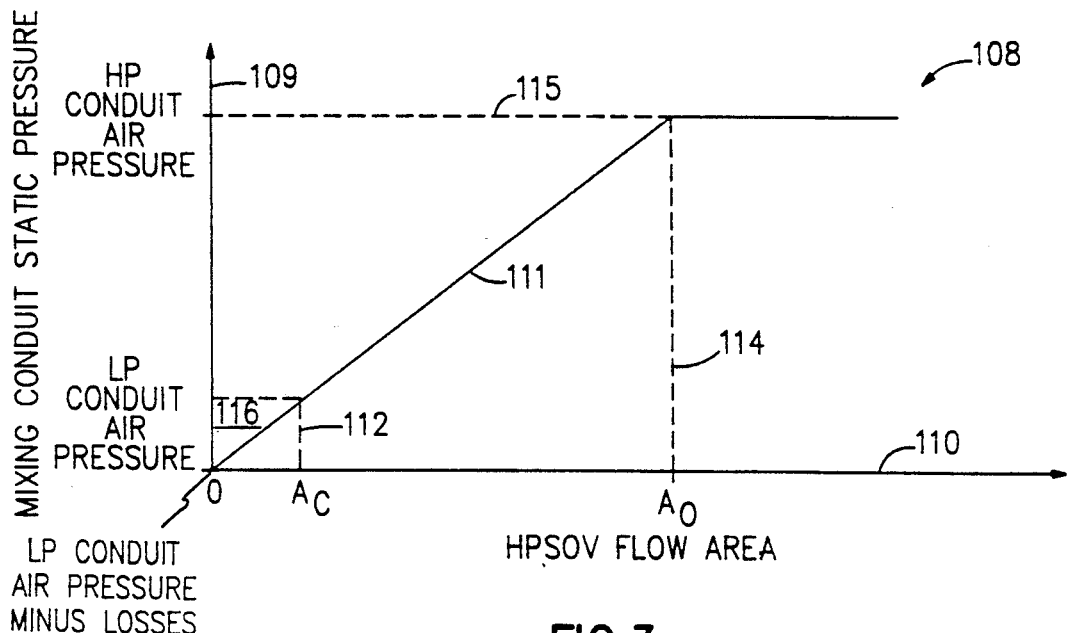
FIG. 3 is a functional illustration used in the description of the embodiment of FIG. 1.

FIG. 3 illustrates a plot 108 of the mixing conduit static pressure 109 versus HPSOV flow area 110. An operating line 111 defines mixing conduit static pressure versus the HPSOV flow area relationship. When the HPSOV flow area is zero (i.e., the HPSOV is closed) the mixing conduit static pressure is equal to the LP conduit air pressure minus the pressure losses in the check valve and the LP line. As the HPSOV flow area increases along the operating line 111, it reaches a flow area value $A_c$ 112 where the LP flow has been reduced to zero (i.e., the check valve 17 closes). As the flow area increases beyond Ac, the LP check valve remains closed and the mixing conduit air pressure increases in a substantially proportional manner until the flow area reaches a value of 114 which represents the maximum HPSOV flow area. At the maximum flow area $A_o$, the mixing conduit static pressure is equal to the HP conduit air pressure, 115.

To facilitate mixing, the pressure of the air exiting the HPSOV must be approximately equal to the pressure of the LP bleed air in order to keep the check valve 17 (FIG. 1) open. Therefore, the HPSOV has a limited operating region 116 (bounded in dashed lines) where mixing occurs. If the HPSOV flow area increases beyond the limited operating region 116 the check valve will close terminating the mixing. Therefore, to sustain mixing the HPSOV flow area has to take on values within the limited operating region 116. It should be understood the specific limited operating region has to be determined based on the characteristics (e.g., friction) of the components within the system.

Figure 4:
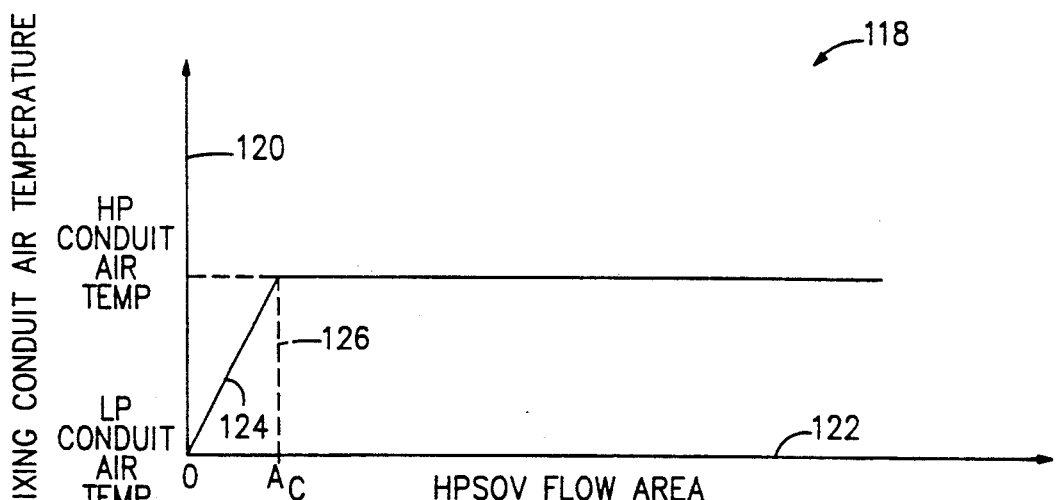
FIG. 4 is another functional illustration used in the description of the embodiment of FIG. 1.

FIG. 4 illustrates a plot 118 of the mixing conduit air temperature 120 versus HPSOV flow area 122. An operating line 124 defines the mixing conduit air temperature versus the HPSOV flow area relationship. When the HPSOV flow area is zero (i.e., the HPSOV is closed) the mixing conduit air temperature is approximately equal to the LP conduit air temperature. As the HPSOV flow area increases along the operating line 124, it reaches a flow area value $A_c$ 126 where the mixing conduit air temperature reaches the value of the HP conduit air temperature. As the HPSOV flow area increases beyond $A_c$ 126, the mixing conduit air temperature remains constant at the HP conduit air temperature since the HP conduit is supplying all the bleed air entering the mixing conduit 18. While HPSOV operates in the proportional valve mode under the control of the logic in FIG. 2, the air temperature in the mixing conduit 18 can only take on values in a region 128, along the operating line 124. The particular value is determined by the reference temperature on the line 66 of the outer closed loop on temperature 58 (FIG. 2).

While the best mode embodiment of the present invention uses an electronic controller, it should be understood the control logic illustrated in FIG. 2 may also be performed mechanically. Furthermore, within the electronic controller 20 the control laws of the present invention can be performed in either hardware or software. It should also be noted the present invention is not limited to mixing of only two bleed air flows. A plurality of bleed air flows may be mixed together by using proportional valves to control each bleed air flow, with the exception of the lowest pressure bleed air flow.

As described hereinbefore the inner pressure loop is faster than the outer temperature loop. As an example, the inner loop may have a bandwidth of 10 radians/second, whereas the slower outer loop bandwidth may be approximately 0.5 radians/second. However, it should be understood the bandwidth of each of these two loops has to be determined in view of the dynamics of the particular bleed air system to be controlled, just as in any control system design, and as such these bandwidth numbers are only examples.

In addition it should be understood that if the bleed air system operates in only the proportional mode, the temperature sensor 46 may be placed in the mixing conduit 18 similar to the positioning of the pressure sensor 40, since the precooler is not operational during the proportional mode. Also, while the exemplary embodiment discussed hereinbefore senses static pressure, it is obvious total pressure may be sensed as an alternative embodiment Notwithstanding the foregoing detailed description, simply stated the present invention mixes high pressure and low pressure bleed air flows from a gas turbine engine to achieve a desired mixed air temperature, by modulating the flow area of the proportional valve through which the high pressure air flows, the pressure at the outlet of the proportional valve is controlled in order to achieve a scheduled pressure value, where the controller determines the scheduled pressure value.

Although the present invention has been shown and described with respect to a best mode embodiment thereof, it should be understood by those skilled in the art that various other changes, omissions and additions to the form and detail thereof, may be made therein without departing from the spirit and scope of the invention

I claim:

1. A bleed air system for receiving high pressure and low pressure compressed air from a gas turbine engine to provide a temperature regulated flow of mixed bleed air substantially equal to a desired mixed air temperature value at the output of a mixing conduit, comprising:
   first means, for mixing in the mixing conduit, the low pressure compressed air with a modulated flow of high pressure compressed air provided by a proportional valve, said proportional valve modulating the flow of high pressure air in response to a valve area command signal;
   means for providing a sensed pressure signal indicative of the actual pressure of the mixed air flow;
   means for providing a sensed temperature signal indicative of the actual temperature of the mixed air flow; and
   controller means for receiving said sensed pressure signal, said sensed temperature signal, and the desired mixed air temperature value, for providing a pressure reference signal, where the value of said pressure reference signal is set as a function of the difference between said sensed temperature signal and the desired mixed air temperature value, and for calculating said valve area command signal in response to the difference between said pressure reference signal and said sensed pressure signal.

2. The bleed air system of claim 1, wherein said first means further comprises:
   a check valve, disposed to receive the low pressure compressed air, and discharge the air into the mixing conduit when the air pressure of the mixed bleed air flow in the mixing conduit is less than or approximately equal to the air pressure of the low pressure compressed air, such that the air exiting said check valve will mix in the mixing conduit with air from said proportional valve, when said proportional valve and said check valve are both not fully closed.

3. The bleed air system of claim 1, wherein said controller means further comprises:
   a first compensator, having an integrator, for an outer control loop on temperature with said sensed temperature signal as a temperature feedback signal; and
   a second compensator, having a proportional plus integral path, for an inner control loop on pressure with said sensed pressure signal as a pressure feedback signal.

4. An apparatus for mixing together the high pressure and low pressure compressed air from a gas turbine engine, to create a temperature regulated mixed air flow, comprising:
   a mixing conduit, having provision to receive compressed air from two or more sources;
   first sensing means, for sensing air pressure in said mixing conduit, and for providing a pressure signal indicative therefore;
   a first conduit;
   second sensing means, for sensing air temperature in said first conduit, and for providing a temperature signal indicative thereof;
   means for coupling said mixing conduit to said first conduit, such that the air flow from said mixing conduit enters said first conduit;
   means for calculating and providing a valve command signal as a function of said pressure signal and said temperature signal; and
   valve means, disposed to receive high pressure compressed air, for modulating in response to said valve command signal the flow area through which the high pressure compressed air passes, and for providing a regulated flow of high pressure compressed air into said mixing conduit, such that the flow area is modulated in response to said valve command signal to mix the low pressure and high pressure air within said mixing conduit in order to create the temperature regulated mixed air flow in said first conduit.

5. The apparatus of claim 4, further comprising:
   a check valve, disposed to receive the low pressure compressed air, and allow the low pressure air to exit into said mixing conduit while the air pressure in said mixing conduit is approximately equal to or less than the air pressure of the low pressure compressed air.

6. The apparatus of claim 4, wherein said means for coupling further comprises:
   a pressure regulating valve, disposed to receive air from said mixing conduit, and control the pressure of the air that is discharged into said first conduit.

7. An apparatus for mixing together the high pressure and low pressure compressed air from a gas turbine engine, to create a temperature regulated mixed air flow, comprising:

a check valve disposed to receive the low pressure compressed air;

a proportional valve, disposed to receive the high pressure compressed air, having a variable flow area responsive to a valve area command signal and through which the high pressure compressed air is discharged;

a mixing conduit, having a plurality of inlets, a first of said plurality of inlets for receiving air from said check valve, a second of said plurality of inlets for receiving air from said proportional valve, such that the air from each of said plurality of inlets is mixed to together within said mixing conduit and discharged as a temperature regulated flow of bleed air;

means for sensing the air pressure of said temperature regulated flow of bleed air, and for providing a pressure signal indicative thereof;

means for sensing the temperature of said temperature regulated flow of bleed air, and for providing a temperature signal indicative thereof; and controller means for computing said valve area command signal as a function of said temperature signal and said pressure signal, such that said valve area command signal takes on a value that drives the temperature of the temperature regulated flow of bleed air towards a desired reference temperature value.

8. A method of providing a temperature regulated flow of bleed air by mixing together a low pressure bleed air flow and a high pressure bleed air flow from a gas turbine engine and discharging the temperature regulated flow of bleed air to systems requiring bleed air, comprising the steps of:

modulating in response to a command signal value, the flow area of a proportional valve through which the high pressure bleed air flows;

combining the modulated high pressure bleed air flow and the low pressure bleed air flow in a mixing conduit;

sensing the temperature of the mixed air flow in the mixing conduit;

sensing the pressure of the mixed air flow in the mixing conduit; and computing said command signal value in response to the sensed temperature and pressure values.

* * * * *